United States Patent [19]

Shou-Jen

[11] Patent Number: 5,350,219
[45] Date of Patent: Sep. 27, 1994

[54] TOOTHBRUSH WITHOUT METAL GASKET

[75] Inventor: Huang Shou-Jen, Taipei Hsien, Taiwan

[73] Assignee: Acumen Co., Ltd, Tapei-Hsien, Taiwan

[21] Appl. No.: 96,883

[22] Filed: Jul. 26, 1993

[51] Int. Cl.⁵ .......................... A46D 1/08; A46D 3/00
[52] U.S. Cl. ........................... 300/21; 300/8; 264/243
[58] Field of Search ............... 300/21, 20, 8; 264/243

[56] References Cited

U.S. PATENT DOCUMENTS

| | | | |
|---|---|---|---|
| 3,026,146 | 3/1962 | Szabo et al. | 300/21 |
| 4,444,711 | 4/1984 | Schad | 264/243 |
| 4,619,485 | 10/1986 | Lewis, Jr. | 300/21 |
| 4,635,313 | 1/1987 | Fassler et al. | 15/193 |
| 4,637,660 | 1/1987 | Weihrauch | 300/21 |
| 4,892,698 | 1/1990 | Weihrauch | 264/243 |
| 5,143,424 | 9/1992 | Boucherie | 300/2 |
| 5,158,342 | 10/1992 | Pai | 300/21 |

Primary Examiner—Mark Rosenbaum
Assistant Examiner—John M. Husar
Attorney, Agent, or Firm—Young & Forward

[57] ABSTRACT

The present invention is related to a toothbrush without metal gasket which is characterized in the following design and process: it consists of a head and a body to wrap and fuse the head, wherein the head is provided with a plurality of bristles-setting holes for setting bristles therein by a toothbrush manufacturing machine. A cross clamping piece is formed at the bottom of each bristles-setting hole, and after the bristles are set in the bristles-setting hole and pass through the cross clamping piece, the bristles can be tightly fixed at the bottom of bristles-setting hole through the cross clamping piece; and when the head with bristles well set thereon is disposed in an extruding molding die of toothbrush body, the head can be wrapped and fused and fixed integrally with the toothbrush body by molding under pressure at a high temperature to form a toothbrush without any metal gasket.

3 Claims, 7 Drawing Sheets (A-A)

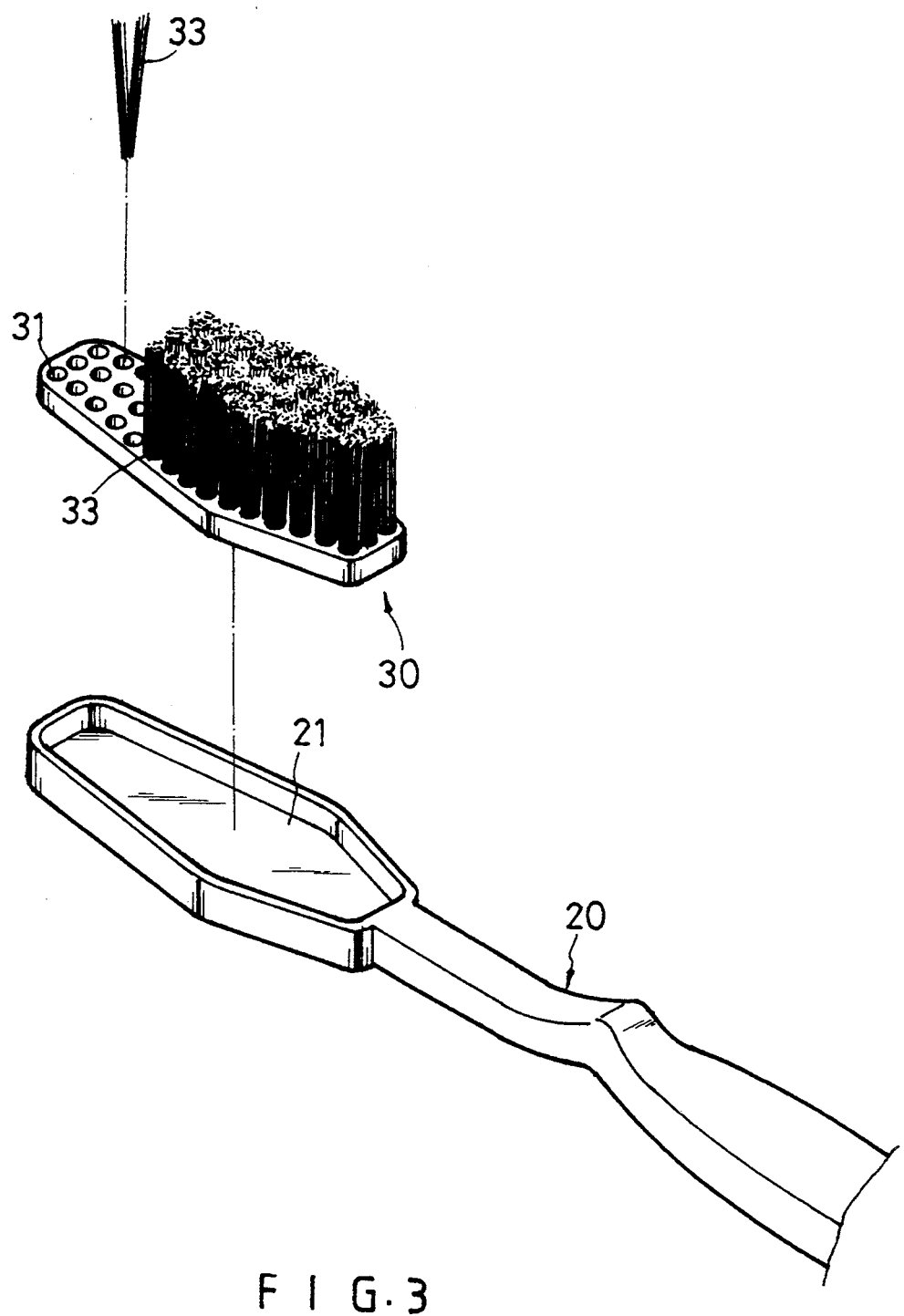
F I G. 3

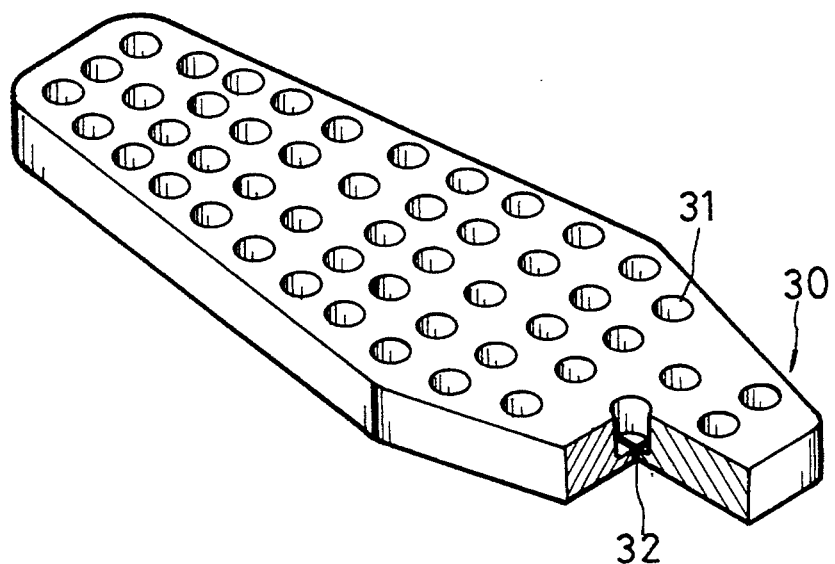
F I G. 4
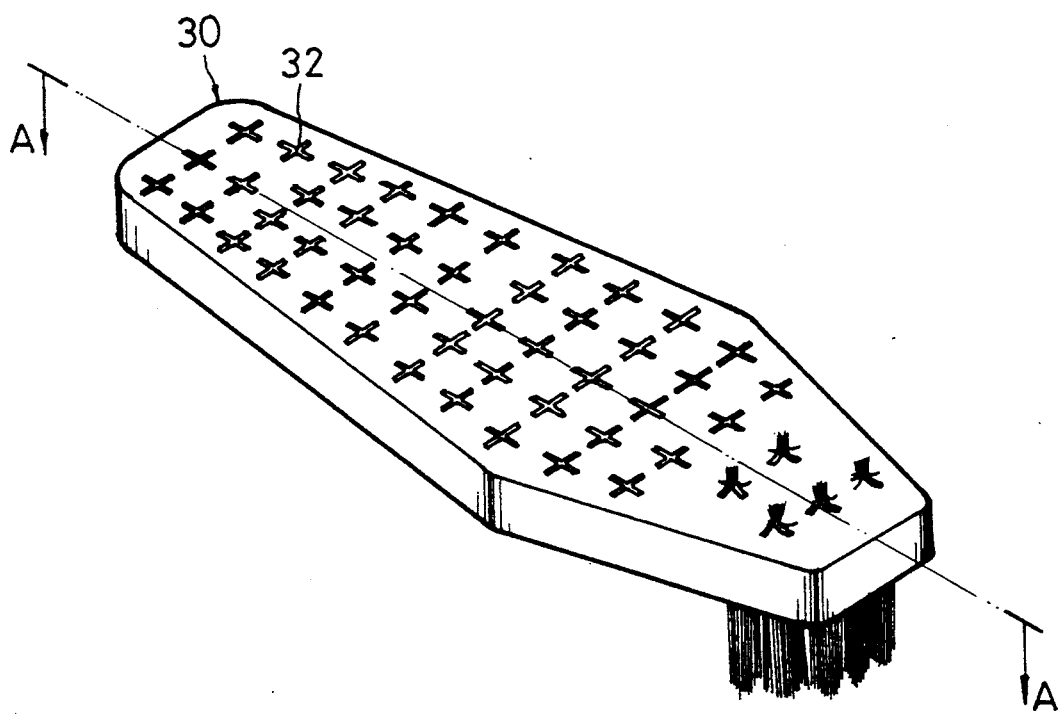
F I G. 5

TOOTHBRUSH WITHOUT METAL GASKET

BACKGROUND OF THE INVENTION:

The conventional toothbrushes are made by means of an automatic toothbrush manufacturing machine for mass production. The major function of said machine is to "automatically set bristles" in the "head" of an integrally moulded toothbrush body for cleaning the user's teeth in his mouth. However, when automatically setting bristles with the foregoing machine, a metal gasket together with a bundle of bristles will be set and inserted in many a bristles-setting groove in the said body, so that the bristles can be firmly set in the said groove and will not come off or become unserviceable when the user uses the toothbrush to clean his teeth. Therefore, disposing a metal gasket in the said groove is aimed at only fixing the bristles therein very firmly.

Since the metal .gasket (made of copper, nickle, chrome or alloy) disposed in the foregoing bristles-setting groove can be oxidized after it contacts hydrogen, oxygen or vapor in the air for a long time, and the residue of toothpaste containing fluorine, the tartar of tooth, and the moisture adhered to the toothbrush will gradually permeate to the bottom of bristles-setting groove to accelerate the oxidation and acidification of said metal gasket and to further generate undesirable chemicals and impuritiy which are detrimental to the health of human body. Once these chemicals and impurity during the action of brushing tooth, residually exist in the user's mouth, or in the course of drinking water, flow into the user's stomach and intestines, they will inevitably affect the health of the human body unfavorably. This is a major drawback of the conventional toothbrush with metal gasket fixed in the bristles-setting groove. In addition, the appropriate authorities in charge of health administration in some countries will also strictly control the unhealthful toothbrushes and bar sales or import of these poor toothbrushes in order to assure the health of their people. For instance, the FDA of the United States takes steps to strictly inspect and examine the toothbrushes with metal Gaskets. Obviously the problem of health and safety derived from toothbrush with metal gasket is a matter of concern.

In view of the drawback derived from the toothbrush with metal gasket which has to be improved without delay, the present inventor invented the present invention which is aimed at eliminating the drawback of conventional toothbrush to avoid the oxidation of metal Gasket from hurting the health of human body.

SUMMARY OF THE INVENTION

The present invention is related to a toothbrush without metal Gasket which is characterized in the following design and process: it consists of a head and a body to wrap and fuse the head, wherein the head is provided with a plurality of bristles-setting holes for setting bristles therein by a toothbrush manufacturing machine, a cross clamping slot is formed at the bottom of each bristles-setting hole, and after the bristles are set in the bristles-setting hole and pass through the cross clamping slot, the bristles can be tightly fixed at the bottom of bristles-setting hole through the cross clamping slot; and when the head with bristles well set thereon is disposed in an extruding moulding die of toothbrush body, the head can be wrapped and fused and fixed integrally with the toothbrush body through the die with a high temperature to form a toothbrush without any metal gasket.

BRIEF DESCRIPTION OF THE INVENTION

FIG. 3 is an exploded perspective view of a constructed according to the present invention.

FIG. 4 is a perspective view of toothbrush head of the present invention.

FIG. 5 is a perspective view showing the bottom face of the toothbrush head of the present invention.

DETAILED DESCRIPTION

Figure 1:
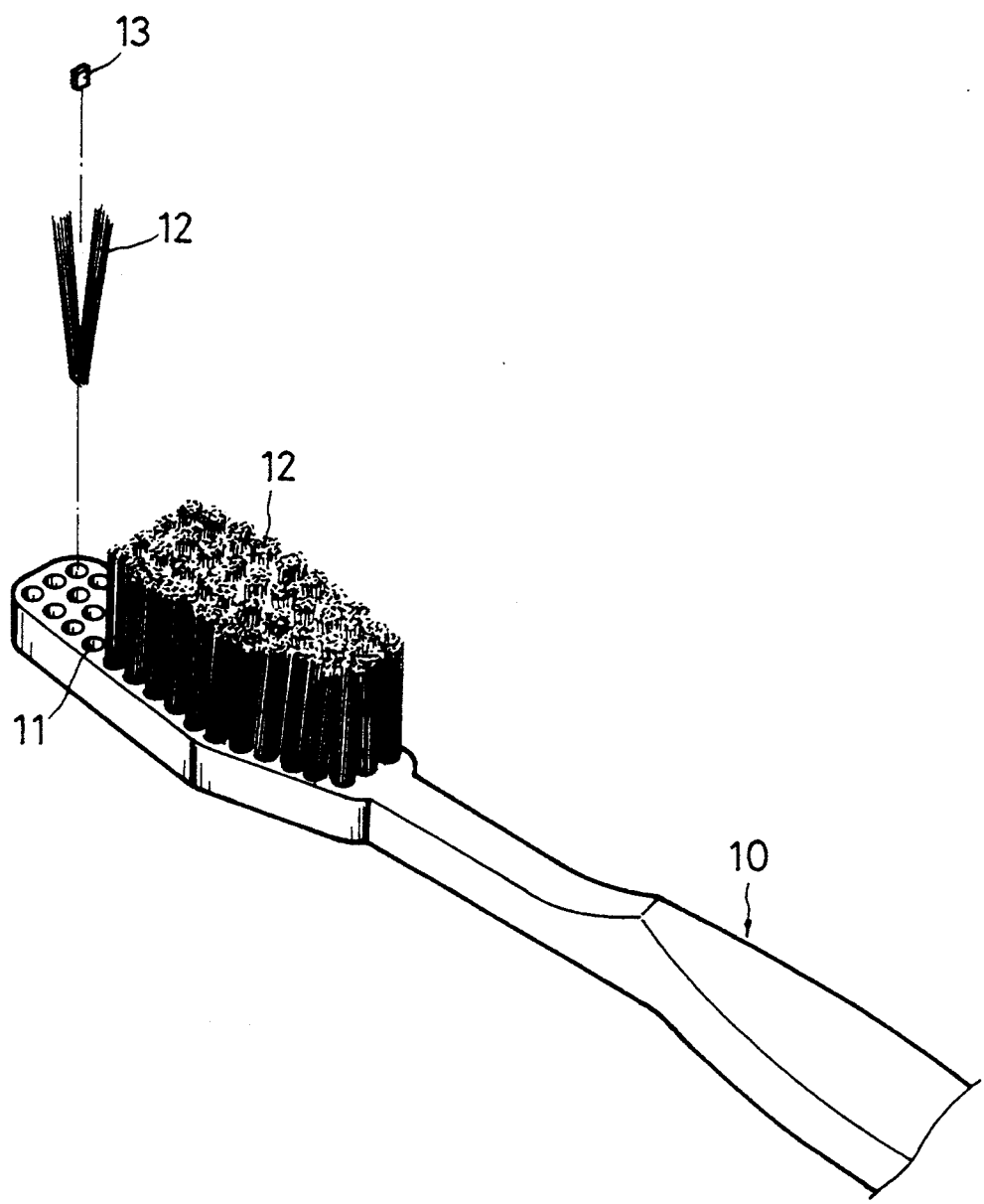
FIG. 1 is a perspective view of a conventional toothbrush.
Figure 2:
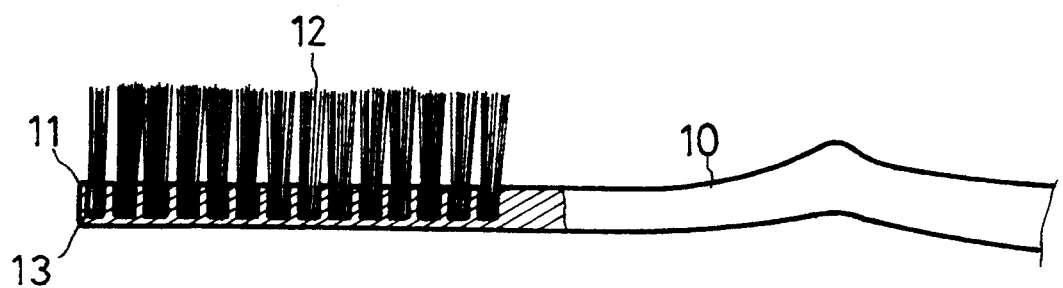
FIG. 2 is a sectional view taken through the conventional toothbrush.
Figure 6:
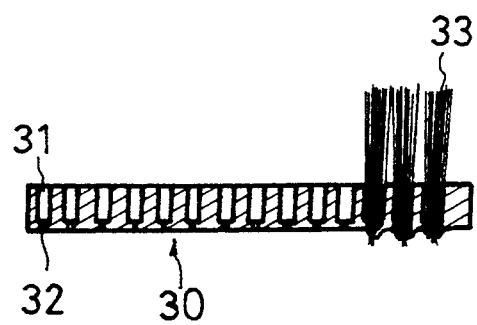
FIG. 6 is a sectional view taken along the line A—A of FIG. 5.

As shown in FIG. 1 and 2, a plurality of bristles-setting grooves (11) on the head on the front edge of the conventional integrally-moulded toothbrush (10) are used to set bristles (12). When the automatic toothbrush manufacturing machine sets the bristles in the bristles-setting grooves (11), one each metal gasket (13) is also instered in each groove (11) at the same time respectively to fix the bristles (12) at the bottom of each said groove (11), so the bristles (12) will not come off during the user cleaning his mouth and teeth with the toothbrush (10). However, since there is a metal gasket (13) in each of the bristles-setting grooves (11) of the foregoing conventional toothbrush (10), the said metal gasket (13) and toothpaste, tartar, moisture and other impurities can combine to cause oxidation and acidification when the user cleans his mouth and teeth with the conventional toothbrush (10). This is a major drawback of the conventional toothbrush (10).

So far as the manufacture of toothbrush according to the present invention is concerned, as shown in FIG. 3, 4 and 5, a bristle carrier (30) is provided with a plurality of bristles-setting holes (31) so that an automatic toothbrush manufacturing machine can automatically sets the bristles (33) in these bristles-setting holes (31). In addition, a cross shaped slot opening (32) is formed at the bottom of each bristles-setting hole (31) and characterized by tenacity and binding force; when the bristles (33) are set in the bristles-setting holes (31) by the toothbrush manufacturing machine and the bottoms of bristles (33) pass through the cross shaped slot openings (32), the bristles (33) can be firmly fixed at the bottom of each bristles-setting hole (31) by the slot openings (32) and will never come off from the bristles-setting hole (31) so as to finish setting bristles in the carrier (30), namely, the second step of manufacturing the toothbrush according to the present invention is finished as shown in FIG. 9.

Figure 7:
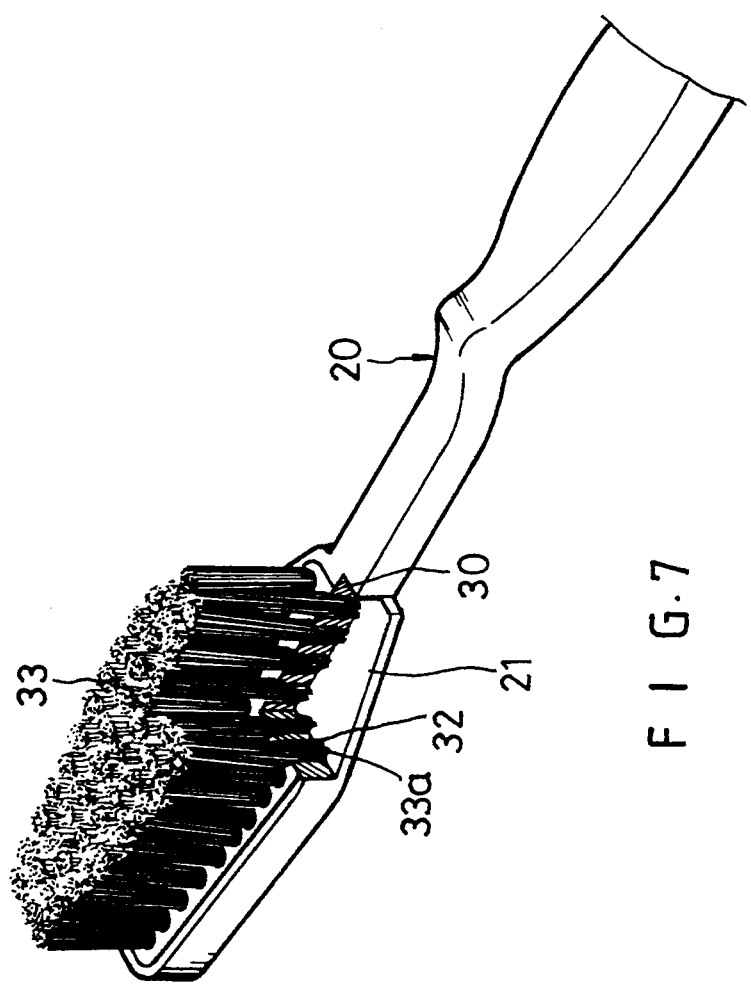
FIG. 7 is an elevational section view of structure of toothbrush according to the present invention.
Figure 8:
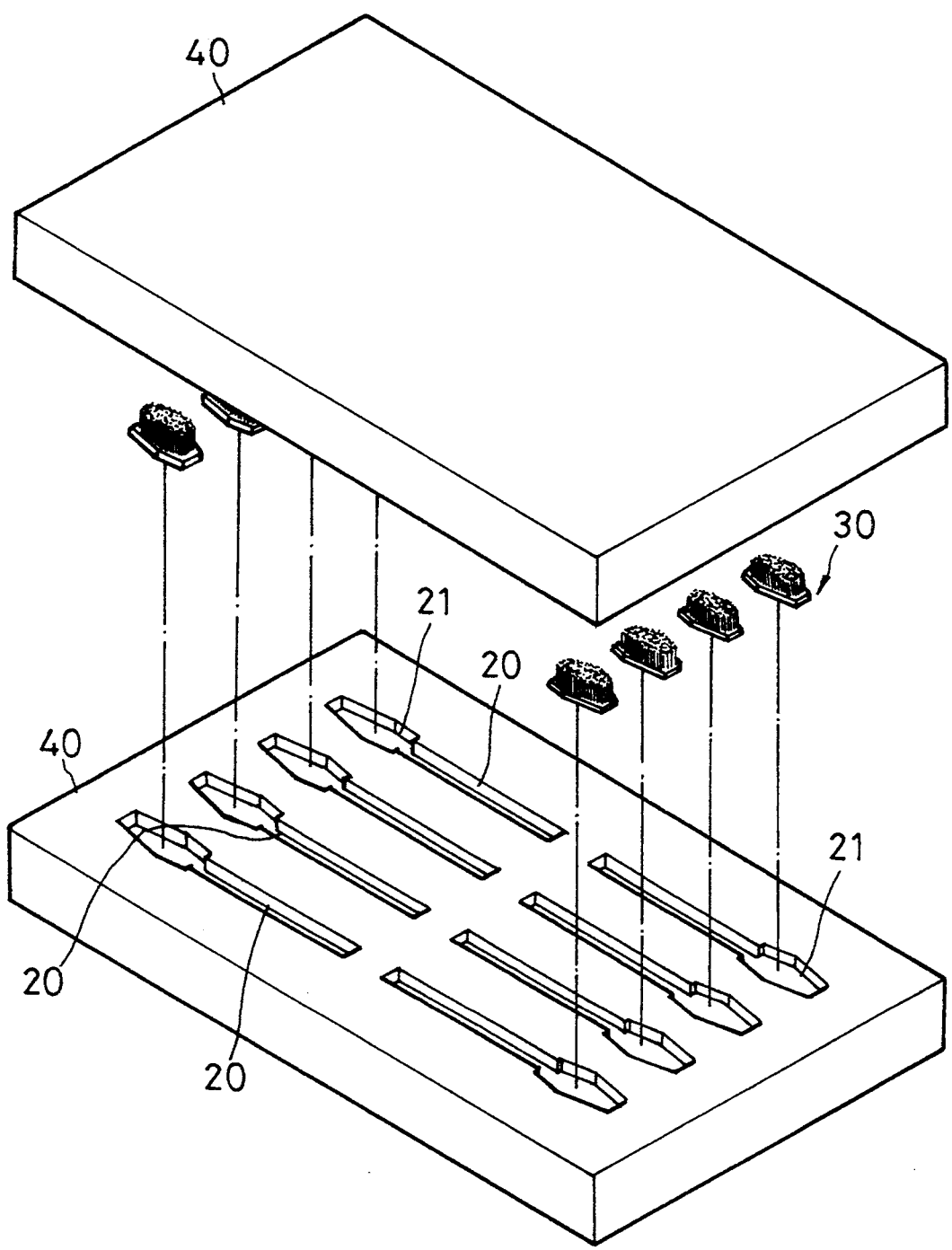
FIG. 8 is an exploded perspective view of a toothbrush head of the present invention disposed in the extuding moulding die of a toothbrush body.
Figure 9:
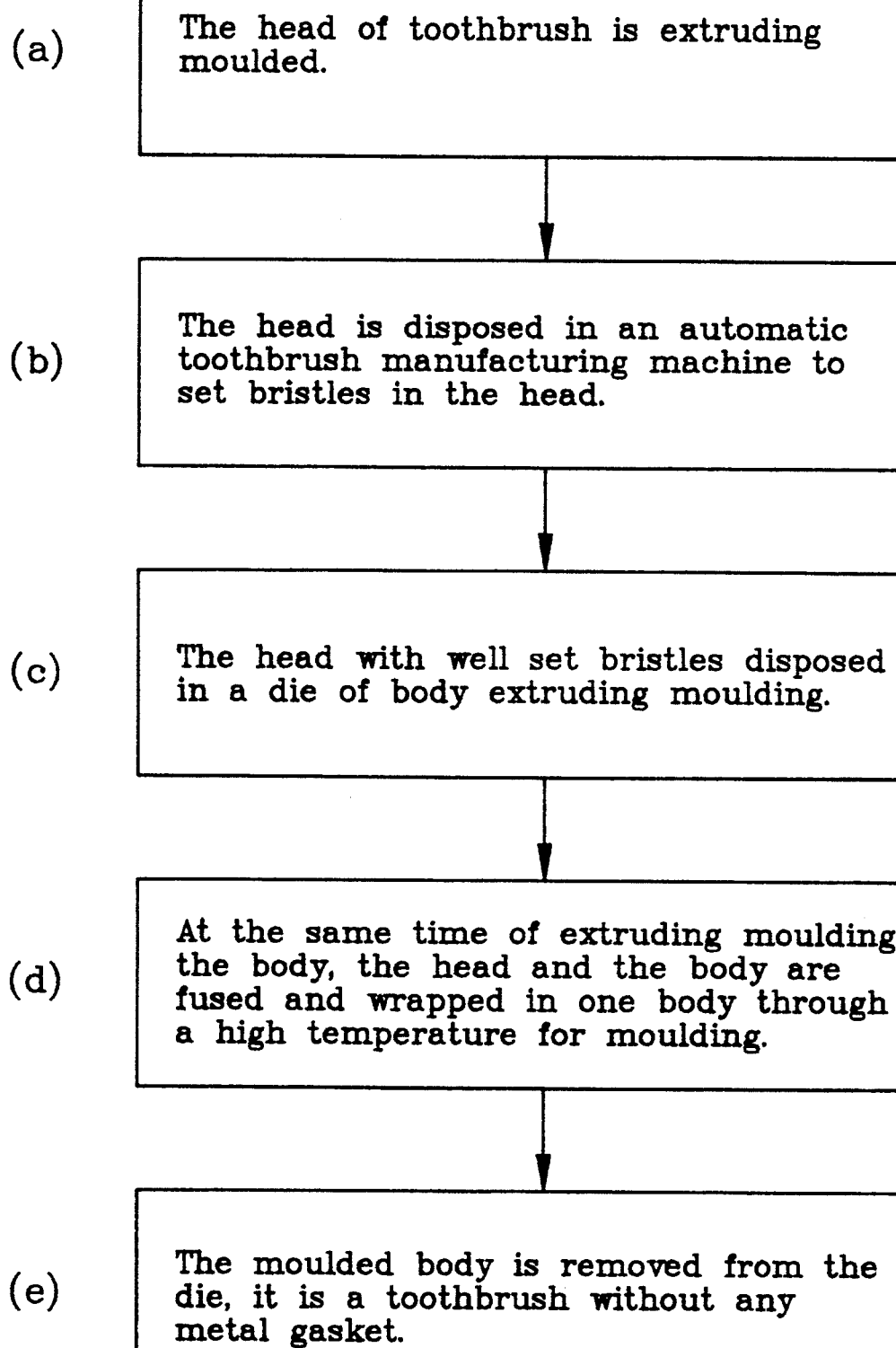
FIG. 9 is a schematic view of flow of manufacturing the present invention

The third and fourth steps of manufacturing the toothbrush of the present invention are shown in FIG. 8 and 9. The bristle carrier (30) with well set bristles (33) is disposed in a cavity section (21) of moulding die (40). Cavity section 21 forms the head of the toothbrush. A second cavity section 20 forms the handle of the toothbrush. The bristle carrier 30 can be placed in cavity section 21, after which moldable plastic material in the cavity is heated under pressure to a high temperature (about 180–200 deg C). The carrier (30) and the bristles (33a) at the bottom of bristles-setting holes (31) as a whole are fused and assembled in one body as shown in FIG. 7 to form a toothbrush without any metal gasket and to finish the manufacturing of toothbrush of the present invention. Through the manufacturing process of toothbrush of the present invention, the head ( 30 ) of toothbrush contains no metal gasket at all; therefore, the present invention can eliminate drawbacks associated with the conventional toothbrush having a metal gasket. A toothbrush meeting health needs can be provided to the consumers, using the toothbrush manufacturing process of the present invention.

In summary, the manufacturing process of toothbrush without metal Gasket of the present invention is very simple but the toothbrush made in line with such a manufacturing process has a head without the ingredient of any metal gasket.

I claim:

1. A toothbrush manufacturing process comprising the steps of:
    a. forming a plastic bristle carrier with first and second major faces, and an array of bristle-reception holes extending between said faces;
    b. stuffing a bundle of bristles into each bristle-reception hole so that each bundle of bristles has anchored portions thereof extending entirely through the associated hole from said first face to a point slightly beyond said second face;
    c. providing a toothbrush mold having a mold cavity that includes a first cavity section for forming the head of a toothbrush, and a second cavity section for forming the handle of a toothbrush;
    d. inserting said bristle carrier into said first section of the mold cavity so that said second face of the carrier faces the cavity interior space;
    e. introducing moldable plastic material into the mold cavity; and
    f. heating the moldable plastic material under bristles and bristle carrier.

2. The toothbrush manufacturing process of claim 1, wherein step (a) is carried out so that each bristle-reception hole comprises a circular opening extending from said first major face of the carrier to a point near the second major face, and a slot opening extending from said circular opening to said second major face; said step (b) being carried out so that the slot openings clamp the bristles to the carrier.

3. The toothbrush manufacturing process of claim 2, wherein each slot opening has a cross shape.

* * * * *